United States Patent Office 3,541,347
Patented Nov. 17, 1970

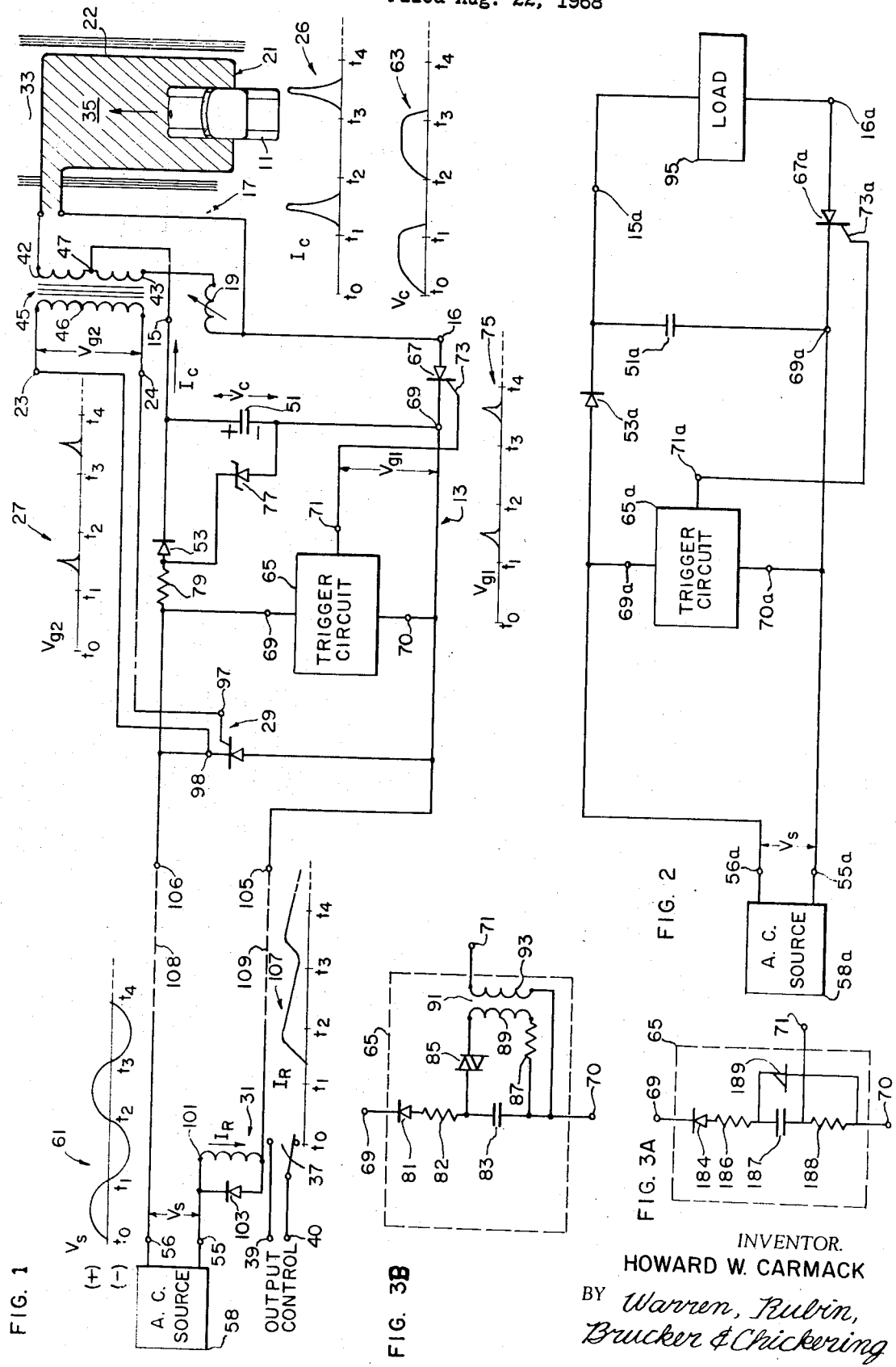

3,541,347
VEHICLE DETECTOR AND PULSE GENERATOR THEREFOR
Howard W. Carmack, 17034 Via Margarita, San Lorenzo, Calif. 94580
Filed Aug. 22, 1968, Ser. No. 754,599
Int. Cl. G08b 13/24
U.S. Cl. 307—108                                     7 Claims

ABSTRACT OF THE DISCLOSURE

Detection circuitry for sensing the presence of a metallic mass, particularly the metallic body of a vehicle, wherein an inductive bridge having as one of its branches a remote sensing inductor, receives a train of electrical pulses thereacross and issues a pulse signal in response to the proximity of the metallic body to the sensing inductor. An output switching circuit responds to this pulse signal to assume an actuated condition indicating the presence of the vehicle.

To generate the requisite train of pulses received by the detection circuit, a capacitor in combination with electronic switching means is periodically charged and pulse discharged in response to a source of alternating current.

---

The invention relates to electronic circuitry and more particularly to a vehicle detection circuit and pulse generator therefor.

In response to the need for more efficient control of traffic, a variety of automatic or traffic responsive intersection control systems have been developed. In general, such a system operates in accordance with the immediate traffic demand at an intersection or the like, wherein detection of approaching vehicles thereto provides information upon which intersection control signals are operated. While such systems are potentially very efficient in the regulation of traffic, it will be appreciated that the reliability thereof depends to a large degree on the accuracy and efficiency of the means for detecting the vehicles.

Of the detection means presently in existence, a type which is commonly referred to as a presence detector has been preferred over others. Presence detection refers to the ability of the apparatus to sense the presence of a vehicle, moving or stationary, within a circumscribed area generally proximate an intersection. This type of device is contrasted with the approach type detector (commonly a pressure switch located in the street) which merely indicates the passage of a vehicle thereover and does not provide the quality of information necessary for more efficient traffic control systems. However, it has been found that available presence detectors usually include a controlled frequency oscillator and are, therefore, subject to instability and false operation due to a variety of causes including varying weather conditions. In order to stabilize such devices, it has been necessary to resort to extensive electronic circuitry which not only increases the cost of the original device but also entails expensive servicing. Furthermore, the complexity of operation, substantial power requirements and bulky packaging of these detectors further decreases the practicality of their wide-spread application. In contrast, the present invention operates on an electrical pulse principle and has been found to provide reliable vehicle detection without the attendance of the above-noted disadvantages. Particularly, in a preferred form of the invention, a combined unique pulse generator and inductive bridge network cooperate in a manner which provides efficient, reliable and sensitive detection of a metallic mass such as provided by the common automobile.

In a preferred form of the invention, the pulse generator embodies a unique capacitive discharge network operated solely in response to a source of alternating current. It has been found, that this pulse generator constructed in accordance with the present invention is advantageously integrated into the detection bridge circuit to provide a compact package having a minimum number of components and reliability not heretofore obtainable.

In view of the above, it is an object of the present invention to provide a vehicle detector capable of high sensitivity yet composed of only a few component parts for low cost mass production, lower power consumption and little servicing.

It is a further object of the present invention to provide a vehicle presence detector having heretofore unobtainable stability and reliability in environments of moderate to extreme weather changes.

It is still another object of the present invention to provide a compact, reliable and efficient pulse generator which in the present case forms a particularly advantageous source of pulses for the vehicle detector circuit.

The invention possesses other objects and features of advantage, some of which of the foregoing will be set forth in the following description of the preferred form of the invention which is illustrated in the drawings accompanying and forming part of this specification. It is to be understood, however, that variations in the showing made by the drawings and description may be adopted within the scope of the invention as set forth in the claims.

In the drawings:

FIG. 1 is a composite, schematic and block diagram of the vehicle detector constructed in accordance with the present invention;

FIG. 2 is a composite, schematic and block diagram of the pulse generator constructed in accordance with the present invention and forming a portion of the circuit of FIG. 1;

FIG. 3A is a detailed schematic diagram of a preferred portion of the circuits shown in FIGS. 1 and 2; and FIG. 3B is an alternative thereof.

In general, the present invention provides a detector for sensing the presence of a metalic body, for example, the metallic body of automobile 11 shown in FIG. 1. For this purpose a generator means generally shown at 13 is disposed to issue a train of electrical pulses across an input, terminals 15 and 16, of an inductive bridge network 17. Bridge network 17 includes a reference inductor 19 and a remote sensing inductor 21 providing a pair of matched inductive branches of the bridge. In response to the proximity of automobile 11 to sensing inductor 21, bridge network 17 is operative to pass a portion of each pulse issued by generator 13 to an output, terminals 23 and 24, thereof. For example, a pair of adjacent current pulses, $I_c$, issued by generator 13 and shown by a graph 26, are applied across terminals 15 and 16. Whereupon inductive bridge 17 issues at an output thereof, terminals 23 and 24, a pair of gating pulses, $V_{g2}$, shown in graph 27 and corresponding in time to the pulses issued by generator 13, but somewhat attenuated relative thereto. In receipt of each of the gating pulses $V_{g2}$, issued by bridge network 17, is an output switching circuit, in this instance composed of shunt switching component 29 and control switching component 31. Components 29 and 31 are responsive to each gating pulse, $V_{g2}$, to provide an output control, terminals 39 and 40 indicative of the presence or proximity of automobile 11 to sensing inductor 21.

It is preferred that sensing inductor 21 take the form of one or more loops 22 of a conductive wire which may be conveniently disposed at or below the surface of pavement 33 of a street approach to an intersection (not shown). As a vehicle, such as illustrated by automobile 11, passes over or stops in area 35 bounded by loop 22, an output control is issued by the detector and this instance taking the form of operated relay contacts 37 of switching component 31. As described herein, contacts 37 will close shorting terminals 39 and 40 and will remain closed so long as automobile 11 remains within area 35.

As shown in the preferred embodiment of the incention, the remaining branches of bridge network 17 comprise a pair of matched primary windings 42 and 43 of a differential transformer 45. Accordingly, the inductive bridge is provided by a first branch, sensing inductor 21; a second branch, reference inductor 19; a third branch, primary winding 42; and a fourth branch, primary winding 43. Furthermore, transformer 45 is provided with secondary winding 46, connected across terminals 23 and 24 providing the output of bridge network 17. As the pair of inductors provided by windings 42 and 43 are impedance matched and the pair of inductors provided by reference inductor 19 and remote sensing inductor 21 (in the absence of automobile 11) are also of matched impedance, bridge network 17 exhibits a normally balanced condition. That is, in the absence of a metallic body proximate sensing inductor 21, each of the pulses issued by generator 13 results in the appearance of equal and opposite signals across secondary windings 42 and 43. Such signals thereby cancel one another in transformer 45 eliminating any output signal across secondary winding 46 thereof.

On the other hand, as a conductive body such as automobile 11 enters area 35, the effective reactance of inductor 21 is reduced from its normal value, thereby placing bridge network 17 in an unbalanced condition. In this state, each of the train of pulses represented by current flow, $I_c$, divides at junction 47 with separate portions thereof flowing through secondary winding 42 and 43. Since the value of inductance 21 has been somewhat decreased and is now less than the value of reference inductor 19, a larger amount of current, $I_c$, will flow through the lower impedance path comprised of winding 42 and inductor 21 than the higher impedance path provided by winding 43 and inductor 19. The difference of these currents results in a pulse output signal across secondary winding 46, which pulse output is illustrated in graph 27, and is effective to actuate switching components 29 and 31 to indicate the presence of a vehicle in area 35.

It is preferred that reference inductor 19 be of a variable type, as shown by the present embodiment. Thus, after remote sensing inductor 21 has been formed and placed on or under pavement 33, reference inductor 19 may be adjusted to closely match the impedance of inductor 21 in situ. Having once set inductor 19, the circuit of the present invention provides reliable presence detection of vehicles without requiring expensive periodic servicing. Moreover, it has been found that the disclosed and presently prefered circuit is unusually insensitive to diverse weather conditions and diurnal temperature changes. It is believed that this stability is in part attributable to the pulse principle upon which the circuit of the present invention operates. Furthermore, tests have shown that the detector is sensitive and positive in operation notwithstanding its economical construction and highly stable characteristics.

As another aspect of the invention, a particularly compact and efficient pulse generator has been devised for producing the train of pulses utilized in the vehicle detector circuit of FIG. 1. As shown therein, pulse generator 13 comprises a capacitor 51, serially connected with a diode 53 providing a rectifier means, across input terminals 55 and 56 which provide an input means adapted for connection to a source of alternating current 58. Diode 53, in this case a solid state diode, is poled to pass positive portions of alternating current source 58 through diode 53 to capacitor 51 for inducing a charfe thereacross. Alternating current source 58 produces a voltage signal, $V_s$, across terminals 55 and 56, the signal being shown on graph 61 as a sinusoidal wave form on a time scale $t_0$, $t_1$, $t_2$, $t_3$ and $t_4$. Accordingly, capacitor 51 is charged to the peak value of signal, $V_s$, during the half period, $t_0$–$t_1$ thereof. The wave form signal, $V_c$, of the instantaneous voltage charge across capacitor 51 is shown by graph 63 drawn to the same time scale as graph 61. In combination with diode 53 and capacitor 51, a switching circuit composed of trigger circuit 65 and controlled rectifier 67 provides a means for discharging capacitor 51 during each negative polarity portion of voltage signal $V_s$. Specifically, controlled rectifier 67 having a normally "off" condition and a controllable "on" condition provides selective relatively high and low impedance connections between terminal 16 and junction 69. By this arrangement, controlled rectifier 67 is responsive to couple or connect capacitor 51 across a load in this case embodied by bridge network 17. Trigger circuit 65 having input terminals 69 and 70 connected across source 58 through switching component 31, is provided with an output terminal 71 connected to gate 73 of controlled rectifier 67. In response to each of the negative polarity portions of wave forms $V_s$, trigger circuit 65 functions to issue a gating pulse to gate 73 switching controlled rectifier 67 to its "on" or low impedance mode. This results in the issuance by output 71 of a series of gating pulses, $V_{g1}$ shown by graph 75 drawn to the same time scale as graphs 61 and 63. Controlled rectifier 67 upon receipt of each such gating pulse is disposed in its "on" condition or low impedance mode thereby connecting capacitor 51 across terminals 15 and 16 causing a discharge of the energy stored thereby. As each of the gating pulses $V_{g1}$ occur after capacitor 51 has reached a peak potential charge, the current pulses $I_c$, issued to bridge network 17 are generally uniform as shown in graph 26. However, to further enhance this uniformity by limiting the peak voltage charge $V_c$ a Zener diode 77 is connected in shunt across capacitor 51 thereby maintaining the peak charge thereacross at a constant level. Also, in the present embodiment, a resistor 79 is connected in series with rectifier 53 so as to limit the amount of current flow to capacitor 51.

Referring to FIG. 3A, trigger circuit 65 schematically shown thereby comprises serially connected diode 184, resistor 186, capacitor 187, and resistor 188 connected between input terminals 69 and 70. A silicon unilateral switch 189 providing a non-linear impedance element is connected in shunt across capacitor 187 and resistor 188. Output terminal 71 is connected between capacitor 187 and resistor 188. In operation, diode 184 of trigger circuit 65 passes negative polarity portions of source signal $V_s$ between terminals 69 and 70 thereby charging capacitor 187. As the charge on capacitor 187 reaches a preselected threshold value, preferably ¼ to ¾ of the negative peak value of $V_s$, silicon unilateral switch 189 responsively assumes a low impedance condition allowing the passage of a pulse current through resistor 188. A pulsed current flowing through resistor 188 produces a gating potential at output terminal 71 which thereby issues one of gating pulses $V_{g1}$ to control rectifier 67, whereupon the above described operation follows.

While the foregoing describes the preferred embodiment of the described trigger circuit 65, an alternative embodiment of a trigger circuit, is shown at FIG. 3B also referred to herein as trigger circuit 65 having output terminal 71 and input terminals 69 and 70, is shown in FIG. 3B. That trigger circuit comprises serially connected diode 81, resistor 82 and capacitor 83 connected between input terminals 69 and 70. A varistor 85 providing a non-linear impedance element and a resistor 87 connects a primary winding 89 of isolation transformer 91 in shunt across capacitor 83. Isolation transformer 91 is also formed with a secondary winding 93 connected between input terminal 70 and output terminal 71. In operation, diode 81 of trigger circuit 65 passes negative polarity portions of source signal $V_s$ between terminals 69 and 70 thereby charging capacitor 83. As the charge on capacitor 83 reaches a preselected value of $V_s$, varistor 85 responsively assumes a low impedance condition allowing the passage of a pulse signal through primary winding 89 of transformer 91. The pulsed primary winding accordingly induces a corresponding yet isolated electrical signal pulse in secondary winding 93, thereby issuing one of gating pulses $V_{g1}$ to control rectifier 67 whereupon the above described operation follows.

While pulse generator 13, has been advantageously incorporated as a portion of the vehicle detector circuit shown in FIG. 1, it is also capable of providing an economical and efficient pulse network in other applications. Referring to FIG. 2, the pulse generator of the present invention is shown in a more generalized preferred form, wherein bridge network 17 has been replaced with a symbolic impedance load 95. The corresponding components and terminals above described with reference to FIG. 1, are denoted in FIG. 2 by like reference numerals having the subscript $a$. Accordingly, capacitor 51a is responsive to first polarity portions of source 58a, passed by rectifier 53a to assume a charge thereacross. In this instance, with the anode 53a connected to terminal 56a and the cathode of the diode connected to capacitor 51a, the first polarity portions of $V_s$ occur when terminal 56a is positive with respect to terminal 55a as in the case above described with reference to FIG. 1. As this polarity orientation reverses across terminals 55a and 56a, in response to the alternating current source, trigger circuit 65a issues a gating pulses to gate 73a of controlled rectifier 67a by means of output 71a. Controlled rectifier 67a thereupon assumes an essentially short circuit between junction 69a and terminal 16a causing capacitor 51a to be discharged through load 95. In this instance, terminals 15a and 16a provide an output means for connection across load 95. Thus, a series of unidirectional polarity pulses are applied across load 95. The duration of each of these pulses is dependent upon the time constant of the parallel combination of capacitor 51a and load 95. That is, the larger the time constant defined by the values of capacitor 51a and load 95, the longer the duration of each output pulse. It is preferred, as in the circuit of FIG. 1, that load 95 be selected with an impedance sufficiently low to allow complete discharge of capacitor 65a within a half cycle of signal $V_s$ provided by source 58a. Accordingly, load 95 will receive with each pulse an esual amount of electrical energy defined by the valve of capacitor 51a and the peak potential of source 58a. This important characteristic of the circuit is substantially independent of the load impedance. That is, both low and high impedance loads wll receive substantially the same amount of energy so long as the load impedance is not so high that the energy cannot be transferred within a half cycle. This characteristic makes the particular pulse generator herein disclosed ideally suited to the present use of vehicle detection by means of an inductive bridge circuit as described; however, the pulse generator may be used wherever this characteristic is desired such as for example in the energizing of gaseous discharge lamps where large changes in impedance occur during start-up and running conditions. The circuit can also be arranged to provide full wave operation where this is required.

Referring again to FIG. 1, the pulse generator of FIG. 2, provides a unique network not only for issuing the train of pulses to bridge network 17, but also for driving the switching components which provide the output control of the detector. As noted above, the output control in this case is embodied by control switching component 31 and shunt switching component 29 to provide at terminals 39 and 40 of component 31 an output switch for indicating the presence of automobile 11 in area 35. Shunt switching component 29 in this case is embodied by a controlled rectifier having a gate 97 and is connected with its cathode anode path in shunt with source 58 and serially connected rectifier 53 and capacitor 51. By this arrangement component 29 is operative in its "on" or low impedance condition to pass negative polarity portions of signal $V_s$ through component 31 to actuate contacts 37. Terminals 23 and 24 of secondary winding 46 of transformer 45, are connected across cathode 98 and gate 97 of controlled rectifier component 29 to issue each of gating pulses $V_{g2}$, thereacross, which dispose the controlled rectifier in its "on" condition. Accordingly, when automobile 11 is in area 35, causing the issuance of gatng pulses $V_{g2}$, controlled rectifier component 29 provides an essentially short circuit shunt across input terminals 55 and 56. This short circuit occurs only during the negative polarity portions of signal $V_s$ due to the polar orientation of controlled rectifier switching component 29. In combination therewith, control switching component 31 in this case embodied by a relay is connected with a coil 101 in series between terminal 55 and controlled rectifier 29. A diode 103 is connected in shunt with coil 101 so as to by-pass current flow thereacross which occurs during positive polarity portions of $V_s$ when terminal 56 is positive with respect to terminal 55. Thus, when controlled rectifier 29 assumes its short circuit condition in response to each gating pulse $V_{g2}$, and source $V_s$ enters its negative polarity portion, a current $I_r$ flows through coil 101 and thereby actuate relay contacts 37 to a closed condition.

Moreover, current $I_r$ shown in graph 107 once initiated will continue to flow through coil 101 during the positive polarity portions of source $V_s$ so long as gating pulses $V_{g2}$ are continually issued. This continued flow of current, $I_r$, best shown in graph 107 between time period $t_2$-$t_3$, is provided by diode 103 which allows current $I_r$ to flow for at least a half period of signal $V_s$ in a closed loop with coil 101 after source $V_s$ enters its positive polarity portion. By virtue of this operation, contacts 37 will remain closed so long as a consecutive train of gating pulses, $V_{g2}$ are issued, evidencing the continued presence of automobile 11 in area 35.

It will be noted that current $I_r$ is normally zero until automobile 11 enters area 35. This is by virtue of the orientation of both diode 103 and diode 53. During negative polarity portions of signal $V_s$ and while switching component 29 is in an "off" condition diode 53 prevents current flow through col 101. During positive polarity portions of signal $V_s$ diode 103 bypasses current flow across coil 101.

It is preferred that the portion of the circuit of FIG. 1 to the right of terminals 105 and 106 be disposed proximate area 35. Such an arrangement avoids the need for extended leads to inductor 21 and thereby enhances the detectors sensitivity and reliability. This may be conveniently achieved in the case of the present invention by placing the portion of the circuit including component 29, generator 13 and network 17, in a small sealed package or container which may be buried adjacent area 35. In such a case, leads 108 and 109 may be extended in substantial distance from area 35 to remaining components of a traffic signal control system. Many traffic control installations require the remote sensing conductor (loop 22) to be installed hundreds of feet from the controller. In the present construction the lines 108 and 109 can be extended for thousands of feet without affecting the operation of the sensor. Control switching component 31 and source 58 would thus be conveniently located for connection to the remaining control circuitry of such a system.

I claim:

1. The detector, including a source of alternating current, for sensing the presence of a metalic mass, comprising in combination:

output circuit means having a normal state and being responsive to receipt of electrical pulses to assume an actuated state in which it indicates the presence of the mass;

inductive bridge means connected to said output circuit means to provide an input therefor and having reference and remote sensing inductors, said bridge means responsive to a metalic mass in the proximity of said sensing inductor to pass a portion of electrical pulses received thereby to said output circuit means for disposing said circuit in its actuated state; and a pulse generator comprising input means adapted for connection to the source of alternating current; a capacitor connected across said input means; rectifier means connected between said capacitor and said input means to pass first polarity portions of the source current to and for charging said capacitor; and switching means connected across said input means and between said capacitor and said bridge means and being responsive to the second polarity portions of source current to connect and discharge said capacitor across said bridge means.

2. A vehicle detection system comprising in combination:

a normally balanced inductive bridge circuit including a vehicle detection loop as one leg thereof, said bridge circuit having an input for receiving pulses and an output at which pulses occur in response to input pulses only when said bridge circuit is unbalanced, said bridge being unbalanced by the presence of a vehicle within said loop;

an A.C. power source delivering power in alternating positive and negative half-cycles;

an output control having at least two operating states and electrically connected to the output of said bridge and responsive to pulses from said bridge to assume a state indicative of a vehicle in said loop;

a pulse generator electrically connected between said bridge circuit and said source and operative during each half-cycle of one polarity of said source to deliver a pulse to the input of said bridge; and a pair only of electrical conductors between said power source and said control, on the one hand, and said pulse generator and said bridge circuit on the other hand, said conductors operative during the half-cycle of one polarity to transmit a signal from said bridge circuit, if any, to said control to indicate the presence of a vehicle in said loop and during the half-cycle of the other polarity to transmit power from said source to said pulse generator.

3. A vehicle detection system comprising in combination;

electrical detection means operative to interrogate a specified portion of roadway at generally fixed spaced intervals of time for the presence of a vehicle therein, said detection means operative in response to finding a vehicle in said portion of roadway to issue a pulse for each interrogation for so long as said vehicle is therein;

control circuit means having at least two operating states, said control circuit means including a switching component electrically disposed to receive pulses issued by said detection means and responsive, during generally fixed spaced intervals of time only, to receipt of a pulse to orient said circuit means to a particular one of its states, and coincidence circuit means, associated with said detection means and said control circuit means, operative to maintain the detection means interrogation intervals and switching component pulse responsive intervals coincident in time.

4. A detector for sensing the presence of a vehicle having a metallic body, comprising in combination:

input means adapted for connection to a source of alternating current;

a capacitor;

rectifier means connecting said capacitor across said input means and being poled to pass first polarity portions of source current to and for charging said capacitor;

an inductive bridge means including a sensing inductor exhibiting a change in inductance in response to proximity of the vehicle thereto to dispose said bridge means in an unbalanced condition;

switching means connecting and discharging said capacitor across said bridge means in response to second polarity portions of source current to issue a train of pulses thereto; and output circuit means connected to said bridge means and having a normal state and an actuated state, said output circuit means responsive to said bridge means in its unbalanced condition to receive therefrom a portion of each pulse issued to said bridge means and assume its actuated state in response thereto.

5. The detector defined in claim 4, said output circuit means comprising, a shunt switching component connected across said input means and having a control connection to said bridge means, and a control switching component providing said normal and actuated states and being connected in series between said input means and shunt switching component, said shunt switching component responsive to each of the pulses delivered by said bridge means in its unbalanced condition to assume a short circuit condition and conduct second polarity portions of the source current through said control switching component to dispose it in its actuated state.

6. The detector defined in claim 5, said control switching component comprising a relay having a coil connected in series between said input means and shunt switching component, and a diode connected across said coil and being poled by by-pass first polarity portions of source current across said coil.

7. The detector defined in claim 5 said shunt switching component comprising a controlled rectifier having a gate connected to said bridge means providing said control connection.

References Cited

UNITED STATES PATENTS

| 2,403,956 | 7/1946 | Schlesinger. | |
| 3,234,539 | 2/1966 | Bagno. | |
| 3,302,128 | 1/1967 | Schoemehl et al. | |
| 3,400,365 | 9/1968 | French | 340—382 |
| 3,430,221 | 2/1969 | Barringer et al. | |
| 3,440,439 | 4/1969 | Nellis | 307—132 |

ROBERT K. SCHAEFER, Primary Examiner

T. B. JOIKE, Assistant Examiner

U.S. Cl. X.R.

307—116, 132; 340—38, 258

UNITED STATES PATENT OFFICE
CERTIFICATE OF CORRECTION

Patent No. 3,541,347        Dated November 17, 1970

Inventor(s) H. W. CARMACK

It is certified that error appears in the above-identified patent and that said Letters Patent are hereby corrected as shown below:

Column 2, line 12, change "lower" to ---low---.

Column 2, line 43, change "metalic" to ---metallic---.

Column 3, line 7, change "incention" to ---invention---.

Column 3, line 16, insert ---and--- before "providing".

Column 3, line 55, change "prefered" to ---preferred---.

Column 3, line 73, change "charfe" to ---charge---.

Column 4, line 75, delete "terminals 55 and 56, the signal being shown on graph 61" and insert ---threshold value, preferably 1/4 to 3/4 of the negative peak---.

Column 5, line 22, after "anode" insert ---of diode---.

Column 5, line 29, change "pulses" to ---pulse---.

Column 5, line 45, change "esual" to ---equal---.

Column 6, line 9, change "ng" to ---ing---.

Column 6, line 43, change "col" to ---coil---.

SIGNED AND
SEALED
MAR 9 1971

(SEAL)
Attest:

Edward M. Fletcher, Jr.
Attesting Officer

WILLIAM E. SCHUYLER,
Commissioner of Patent